ically, an antenna of a predetermined length defined by the operating frequency.

United States Patent

Goff et al.

[11] Patent Number: 6,154,137
[45] Date of Patent: Nov. 28, 2000

[54] IDENTIFICATION TAG WITH ENHANCED SECURITY

[75] Inventors: Edward D. Goff, Oakdale; Gerald L. Karel, Maplewood; Chester Piotrowski, White Bear Lake; Robert A. Sainati, Bloomington; Ching-Long Tsai, Woodbury, all of Minn.

[73] Assignee: 3M Innovative Properties Company, St. Paul, Minn.

[21] Appl. No.: 09/093,120

[22] Filed: Jun. 8, 1998

[51] Int. Cl.[7] .................................................. G08B 13/14
[52] U.S. Cl. ...................................... 340/572.4; 340/572.6; 340/572.7
[58] Field of Search ................................ 340/571, 551, 340/572.1, 572.2, 572.4, 572.6, 572.7, 572.8, 568.1, 568.7

[56] References Cited

U.S. PATENT DOCUMENTS

| | | | |
|---|---|---|---|
| 3,747,086 | 7/1973 | Peterson | 340/280 |
| 3,752,960 | 8/1973 | Walton | 340/825.3 |
| 3,790,945 | 2/1974 | Fearon | 340/280 |
| 3,816,708 | 6/1974 | Walton | 340/825.3 |
| 4,063,229 | 12/1977 | Welsh et al. | 340/571 |
| 4,141,078 | 2/1979 | Bridges et al. | 235/375 |
| 4,183,027 | 1/1980 | Ehrenspeck | 343/726 |
| 4,223,830 | 9/1980 | Walton | 235/380 |
| 4,312,003 | 1/1982 | Robbins, Jr. | 343/788 |

(List continued on next page.)

FOREIGN PATENT DOCUMENTS

| | | | |
|---|---|---|---|
| 0 494 114 | 7/1991 | European Pat. Off. | G07C 9/00 |
| 0 526 038 | 2/1993 | European Pat. Off. | G08B 13/24 |
| 0 585 132 | 3/1994 | European Pat. Off. | G01S 13/78 |
| 0 598 624 | 5/1994 | European Pat. Off. | G01S 13/02 |
| 0 615 285 | 9/1994 | European Pat. Off. | H01L 21/60 |
| 0 637 093 | 2/1995 | European Pat. Off. | H01Q 5/02 |
| 0 689 151 | 12/1995 | European Pat. Off. | G06K 7/10 |
| 0 702 323 A2 | 3/1996 | European Pat. Off. | G06K 17/00 |
| 0 710 853 | 5/1996 | European Pat. Off. | G01S 13/75 |
| 0 740 262 | 10/1996 | European Pat. Off. | G06K 7/10 |
| 0 747 990 | 12/1996 | European Pat. Off. | H01Q 1/24 |
| 0 762 535 | 3/1997 | European Pat. Off. | H01Q 7/06 |
| 0 794 507 A2 | 9/1997 | European Pat. Off. | G06K 17/00 |
| 0 805 507 | 11/1997 | European Pat. Off. | H01Q 1/27 |
| 0 810 567 | 12/1997 | European Pat. Off. | G08B 13/24 |
| 0 825 672 | 2/1998 | European Pat. Off. | H01Q 5/00 |
| 2 701 146 | 8/1994 | France | G09F 3/02 |
| 43 19 878 | 12/1993 | Germany | G06K 7/08 |
| 4415801 | 9/1994 | Germany | 340/572.1 |
| 43 41 880 A1 | 6/1995 | Germany | G07C 11/00 |
| 04047995 | 2/1992 | Japan | B42D 15/10 |
| 07254092 | 10/1995 | Japan | G08B 13/24 |
| 9400091 | 9/1995 | Netherlands | A01K 11/00 |
| 2 098 768 | 11/1982 | United Kingdom | G06K 7/08 |
| 2 186 467 | 8/1987 | United Kingdom | G08B 13/24 |
| 2 306 726 A | 5/1997 | United Kingdom | G08C 15/06 |
| WO 95/12870 | 5/1995 | WIPO | G08B 13/14 |
| WO 97/15031 | 4/1997 | WIPO | G07F 7/06 |
| WO 97/29464 | 8/1997 | WIPO | G08B 13/24 |
| WO 97/36270 | 10/1997 | WIPO | G08B 13/24 |
| WO 97/50057 | 12/1997 | WIPO | G06M 1/12 |
| WO 98/13800 | 4/1998 | WIPO | G08B 13/14 |
| WO 98/13804 | 4/1998 | WIPO | G08B 13/181 |
| WO 98/13805 | 4/1998 | WIPO | G08B 23/00 |
| WO 98/16070 | 4/1998 | WIPO | H04Q 1/00 |
| WO 98/27670 | 6/1998 | WIPO | H04B 7/08 |
| WO 99/05659 | 2/1999 | WIPO | G08B 13/14 |
| WO 99/05660 | 2/1999 | WIPO | G08B 13/14 |
| WO 99/65006 | 12/1999 | WIPO | G08B 17/00 |

OTHER PUBLICATIONS

Flyer entitled "Combined Anti–Theft and RF Programmable Tag" from ISK(RF/ID) Ltd.

John Bowers; "Road to intelligent tagging is paved with opportunities", Automatic I.D. News; Oct. 1995 pp. 86–87.

*Primary Examiner*—Van T. Trieu
*Attorney, Agent, or Firm*—Peter L. Olson

[57] ABSTRACT

A combination tag is disclosed, including a magnetically-responsive element and a radio frequency-responsive element. In one embodiment, the magnetically-responsive element also functions as an antenna for the radio frequency-responsive element.

24 Claims, 4 Drawing Sheets

U.S. PATENT DOCUMENTS

| | | | |
|---|---|---|---|
| 4,319,674 | 3/1982 | Riggs et al. .............................. 194/4 |
| 4,407,000 | 9/1983 | Sasaki et al. ........................... 343/726 |
| 4,413,254 | 11/1983 | Pinneo et al. ........................ 340/572.6 |
| 4,442,507 | 4/1984 | Roesner ................................. 365/100 |
| 4,578,654 | 3/1986 | Tait ........................................ 333/175 |
| 4,580,041 | 4/1986 | Walton .................................. 235/380 |
| 4,583,083 | 4/1986 | Bogasky ............................... 340/572.1 |
| 4,598,276 | 7/1986 | Tait ........................................ 340/572 |
| 4,656,463 | 4/1987 | Anders et al. ......................... 340/572.4 |
| 4,656,592 | 4/1987 | Spaanenburg et al. ................. 364/490 |
| 4,660,025 | 4/1987 | Humphrey ............................ 340/572.2 |
| 4,673,932 | 6/1987 | Ekchian et al. ...................... 340/10.32 |
| 4,688,026 | 8/1987 | Scribner et al. ........................ 235/385 |
| 4,745,401 | 5/1988 | Montean ............................... 340/572 |
| 4,746,830 | 5/1988 | Holland .............................. 310/313 D |
| 4,746,908 | 5/1988 | Montean ............................... 340/551 |
| 4,785,308 | 11/1988 | Newcomb .............................. 343/795 |
| 4,796,074 | 1/1989 | Roesner ................................. 357/51 |
| 4,805,232 | 2/1989 | Ma ......................................... 455/291 |
| 4,827,395 | 5/1989 | Anders et al. ........................ 340/572.1 |
| 4,837,568 | 6/1989 | Snaper .................................. 340/10.52 |
| 4,857,893 | 8/1989 | Carroll .................................. 340/572.7 |
| 4,862,160 | 8/1989 | Ekchian et al. ...................... 340/10.32 |
| 4,881,061 | 11/1989 | Chambers ............................ 340/572.1 |
| 4,924,210 | 5/1990 | Matsui et al. ........................ 340/10.41 |
| 4,940,966 | 7/1990 | Pettigrew et al. ....................... 340/551 |
| 4,964,053 | 10/1990 | Humble ................................. 705/416 |
| 4,967,185 | 10/1990 | Montean ............................... 340/551 |
| 4,980,670 | 12/1990 | Humphrey et al. ..................... 340/572 |
| 5,019,815 | 5/1991 | Lemelson et al. ...................... 340/933 |
| 5,036,308 | 7/1991 | Fockens .............................. 340/825.34 |
| 5,059,951 | 10/1991 | Kaltner ................................. 340/572.3 |
| 5,063,380 | 11/1991 | Wakura ............................... 340/825.49 |
| 5,072,222 | 12/1991 | Fockens ................................ 342/44 |
| 5,083,112 | 1/1992 | Piotrowski et al. .................. 340/572.1 |
| 5,095,362 | 3/1992 | Roesner ................................. 357/23.4 |
| 5,099,226 | 3/1992 | Andrews ............................... 340/505 |
| 5,099,227 | 3/1992 | Geiszler et al. ...................... 340/572.5 |
| 5,103,222 | 4/1992 | Esch et al. ............................ 340/10.1 |
| 5,119,070 | 6/1992 | Matsumoto et al. ................. 340/572.5 |
| 5,151,684 | 9/1992 | Johnsen ................................ 340/568.1 |
| 5,153,842 | 10/1992 | Dlugos et al. .......................... 700/227 |
| 5,175,419 | 12/1992 | Yamashita ............................. 235/449 |
| 5,204,526 | 4/1993 | Yamashita et al. .................... 235/493 |
| 5,214,409 | 5/1993 | Beigel ................................. 340/825.34 |
| 5,214,410 | 5/1993 | Verster ................................. 340/505 |
| 5,218,343 | 6/1993 | Stobbe et al. ........................ 340/573.4 |
| 5,218,344 | 6/1993 | Ricketts ............................... 340/573.4 |
| 5,260,690 | 11/1993 | Mann et al. ......................... 340/572.1 |
| 5,280,159 | 1/1994 | Schultz et al. ......................... 235/382 |
| 5,288,980 | 2/1994 | Patel et al. ............................ 235/381 |
| 5,296,722 | 3/1994 | Potash et al. .......................... 257/50 |
| 5,313,192 | 5/1994 | Ho et al. ................................ 350/551 |
| 5,317,309 | 5/1994 | Vercellotti et al. ................... 340/572.4 |
| 5,331,313 | 7/1994 | Koning ................................. 340/551 |
| 5,334,822 | 8/1994 | Sanford ................................. 705/28 |
| 5,339,074 | 8/1994 | Shindley et al. .................... 340/825.31 |
| 5,347,263 | 9/1994 | Carroll et al. ........................ 340/10.42 |
| 5,347,280 | 9/1994 | Schuermann .......................... 342/42 |
| 5,353,011 | 10/1994 | Wheeler et al. ..................... 340/572.4 |
| 5,378,880 | 1/1995 | Eberhardt ............................. 235/439 |
| 5,392,028 | 2/1995 | Pichel ................................. 340/572.5 |
| 5,401,584 | 3/1995 | Minasy et al. ......................... 428/611 |
| 5,406,263 | 4/1995 | Tuttle .................................... 340/572 |
| 5,407,851 | 4/1995 | Roesner ................................. 437/47 |
| 5,420,757 | 5/1995 | Eberhardt et al. ...................... 361/813 |
| 5,430,441 | 7/1995 | Bickley et al. ......................... 340/825 |
| 5,432,864 | 7/1995 | Lu et al. ................................. 382/118 |
| 5,444,223 | 8/1995 | Blama .................................... 235/435 |
| 5,446,447 | 8/1995 | Carney et al. .......................... 340/572 |
| 5,448,110 | 9/1995 | Tuttle et al. ............................ 257/723 |
| 5,448,220 | 9/1995 | Levy ...................................... 340/539 |
| 5,450,070 | 9/1995 | Massar et al. ...................... 340/825.35 |
| 5,450,492 | 9/1995 | Hook et al. ............................ 380/28 |
| 5,469,363 | 11/1995 | Saliga .................................... 700/225 |
| 5,471,203 | 11/1995 | Sasaki et al. ....................... 340/825.31 |
| 5,490,079 | 2/1996 | Sharpe et al. .......................... 705/418 |
| 5,497,140 | 3/1996 | Tuttle .................................... 340/10.1 |
| 5,499,017 | 3/1996 | Beigel ................................. 340/825.34 |
| 5,517,195 | 5/1996 | Narlow et al. ....................... 340/572.1 |
| 5,519,381 | 5/1996 | Marsh et al. .......................... 340/10.2 |
| 5,521,601 | 5/1996 | Kandlur et al. ........................ 342/44 |
| 5,528,222 | 6/1996 | Moskowitz et al. ................. 340/572.7 |
| 5,528,251 | 6/1996 | Frein ..................................... 343/749 |
| 5,538,803 | 7/1996 | Gambino et al. .................. 428/694 TM |
| 5,539,394 | 7/1996 | Cato et al. ............................ 340/10.32 |
| 5,539,775 | 7/1996 | Tuttle et al. ............................ 375/145 |
| 5,541,585 | 7/1996 | Duhame et al. .................... 340/825.69 |
| 5,541,604 | 7/1996 | Meier .................................... 342/42 |
| 5,550,547 | 8/1996 | Chan et al. ............................. 342/42 |
| 5,552,778 | 9/1996 | Schrott et al. ...................... 340/825.34 |
| 5,554,974 | 9/1996 | Brady et al. ........................... 340/572 |
| 5,563,583 | 10/1996 | Brady et al. ......................... 340/572.2 |
| 5,565,846 | 10/1996 | Geiszler et al. ........................ 340/572 |
| 5,565,847 | 10/1996 | Gambino et al. .................... 340/572.6 |
| 5,565,858 | 10/1996 | Guthrie ............................... 340/825.35 |
| 5,574,372 | 11/1996 | Moritz et al. .......................... 324/318 |
| 5,589,820 | 12/1996 | Robinson et al. ................... 340/572.3 |
| 5,602,527 | 2/1997 | Suenaga ................................. 350/551 |
| 5,602,538 | 2/1997 | Orthmann et al. ..................... 340/10.2 |
| 5,604,486 | 2/1997 | Lauro et al. ............................ 340/572 |
| 5,606,323 | 2/1997 | Heinrich et al. ..................... 340/10.34 |
| 5,625,341 | 4/1997 | Giles et al. ............................. 340/572 |
| 5,629,981 | 5/1997 | Nerlikar ................................. 380/25 |
| 5,635,693 | 6/1997 | Benson et al. ....................... 340/10.33 |
| 5,640,002 | 6/1997 | Ruppert et al. ..................... 235/462.46 |
| 5,646,592 | 7/1997 | Tuttle .................................... 340/572 |
| 5,673,037 | 9/1997 | Cesar et al. .......................... 340/10.32 |
| 5,680,106 | 10/1997 | Schrott et al. ....................... 340/10.33 |
| 5,682,142 | 10/1997 | Loosmore et al. ................... 340/572.1 |
| 5,682,143 | 10/1997 | Brady et al. ........................... 340/572 |
| 5,689,238 | 11/1997 | Cannon Jr. et al. .................. 340/572.1 |
| 5,694,139 | 12/1997 | Saito et al. ............................. 343/866 |
| 5,705,818 | 1/1998 | Kelbel et al. .......................... 250/361 |
| 5,708,423 | 1/1998 | Ghaffari et al. .................... 340/825.35 |
| 5,729,201 | 3/1998 | Jahnes et al. ........................ 340/572.1 |
| 5,729,607 | 3/1998 | DeFries et al. ........................ 380/263 |
| 5,736,929 | 4/1998 | Schrott et al. ....................... 340/572.1 |
| 5,739,754 | 4/1998 | Schrott et al. ....................... 340/572.2 |
| 5,739,765 | 4/1998 | Stanfield et al. ................... 340/825.49 |
| 5,745,036 | 4/1998 | Clare .................................... 340/572.1 |
| 5,786,764 | 7/1998 | Engellenner ......................... 340/572.4 |
| 5,789,626 | 7/1998 | Brady et al. ............................ 257/673 |
| 5,801,699 | 9/1998 | Hocker et al. ......................... 345/348 |
| 5,821,859 | 10/1998 | Schrott et al. ....................... 340/572.6 |
| 5,822,714 | 10/1998 | Cato ...................................... 702/108 |
| 5,831,532 | 11/1998 | Gambino et al. .................... 340/572.1 |
| 5,859,587 | 1/1999 | Alicot et al. ......................... 350/572.8 |
| 5,929,801 | 7/1999 | Aslanidis et al. ....................... 342/44 |
| 5,939,984 | 8/1999 | Brady et al. ......................... 340/572.1 |
| 5,963,134 | 10/1999 | Bowers et al. ...................... 340/572.1 |

IDENTIFICATION TAG WITH ENHANCED SECURITY

TECHNICAL FIELD

The invention relates to an identification tag of the type used with a detector to identify and surveil objects such as library media and consumer goods.

BACKGROUND OF THE INVENTION

Electronic article surveillance ("EAS") systems detect the presence of small electronic devices placed on or in an article or carried by a person of interest, and are often used in retail or library environments to deter theft or other unauthorized removal of articles. These devices, which are commonly known as tags or markers, have in the past contained only information regarding the presence of an item. This information could be obtained by electronically interrogating the tag, either intermittently or continuously. At least four distinct types of EAS systems have evolved over the years, based on how this interrogation was carried out: magnetic, magnetomechanical, radio frequency, and microwave. Of these four, magnetic systems have provided the highest level of security in most applications. Magnetic tags are easily hidden in or on an object, difficult to defeat (because they are less susceptible to shielding, bending, and pressure), and easy to deactivate and reactivate, thereby providing a high degree of security and some information regarding the status of a tagged article.

Many users of EAS systems desire to know more than just whether a tagged object is present. They also want to know which tagged object is present, for example. Detailed information regarding the characteristics of objects, such as their date of manufacture, inventory status, and owner have generally been communicated to automated handling and control systems through an optical bar code. While inexpensive and effective, the optical bar code system has certain limitations. Bar codes must be visible, which limits the locations in which they may be placed, and bar codes can easily be obscured, either accidentally or intentionally. The range at which a detector can sense the bar code is also comparatively small. The bar code may also have to be appropriately positioned for detection. Also, because bar codes are often exposed to permit detection, the barcode is susceptible to damage that can result in detection failures. Lastly, multiple items must be processed one at a time. These constraints of bar code systems make them undesirable or inefficient for some applications, such as marking library media.

More recently, electronic identification (also known as radio frequency identification or RFID) techniques have been developed to address the limitations of optical barcodes. RFID systems have succeeded in providing object identification and tracking, but are deficient in providing object security because most RFID systems operate in frequency ranges (~1 MHz and above) in which the tag is easily defeated. The security deficiency associated with radio frequency tags arises because they can be "shielded" by, for example, covering the tag with a hand or aluminum foil, or even placing the tag in a book. Even battery-powered radio frequency tags may be blocked, although their range is superior and blocking would be more difficult. Thus, objects tagged with an RFID tag may escape detection, either inadvertently or intentionally. This greatly reduces their effectiveness as security devices. RFID markers are also related to "smart cards." Both contact and contactless smart cards have appeared in commercial applications. Smart cards tend to be associated with a specific person rather than with a tagged object. Issues related to the security and tracking of the smart card (or of the person carrying it) are similar to those discussed above for RFID markers.

The security issues associated with RFID markers are similar to those familiar to anyone skilled in the art of radio frequency- and microwave-based EAS tags. Substantial effort has been expended in attempts to remedy the deficiencies of radio frequency- and microwave-based EAS tags. However, none has substantially improved their performance as security tags. U.S. Pat. No. 5,517,195 (Narlow et al.), entitled "Dual Frequency EAS Tag with Deactivation Coil," describes a dual frequency microwave EAS tag that includes an antenna circuit having a diode, and a deactivation circuit. The deactivation circuit responds to a low energy alternating magnetic field by inducing a voltage in the diode of the antenna circuit so as to disable the diode and the antenna, thereby deactivating the tag. Although useful for some applications, the capacitor-based tag disclosed in Narlow et al. may leak electrical charge over time, which could cause the tag to become activated unintentionally.

Radio frequency EAS tags of the type disclosed in U.S. Pat. No. 4,745,401 (Montean et al.) include a magnetic element. The magnetic element alters the tuning of the tag when it has been suitably magnetized by an accessory device, and thereby blocks the radio frequency response of the tag. Although these tags have a certain utility, they still do not address the issues of enhanced security and identification.

Radio frequency identification technology has been developed by a number of companies, including Motorola/Indala (see U.S. Pat. Nos. 5,378,880 and 5,565,846), Texas Instruments (see U.S. Pat. Nos. 5,347,280 and 5,541,604), Mikron/Philips Semiconductors, Single Chip Systems (see U.S. Pat. Nos. 4,442,507; 4,796,074; 5,095,362; 5,296,722; and 5,407,851), CSIR (see European document numbers 0 494 114 A2; 0 585 132 A1; 0 598 624 A1; and 0 615 285 A2), IBM (see U.S. Pat. Nos. 5,528,222; 5,550,547; 5,521,601; and 5,682,143), and Sensormatic Electronics (see U.S. Pat. No. 5,625,341). These tags all attempt to provide remote identification without the need for a battery. They operate at frequencies ranging from 125 KHz to 2.45 GHz. The lower frequency tags (~125 KHz) are moderately resistant to shielding, but have only limited radio frequency functionality due to bandwidth constraints. In particular, systems based on these markers generally operate reliably only when a single tag is in the interrogation zone at a time. They also tend to be relatively bulky and expensive to manufacture. At higher frequencies, (typically 13.56 MHz, 915 MHz, and 2.45 GHz), the added bandwidth available has permitted the development of systems which can reliably process multiple tags in the interrogation zone in a short period of time. This is highly desirable for many product applications. In addition, some of the tag designs hold the promise of being relatively inexpensive to manufacture and therefore more attractive to a customer. However, these higher frequency devices share to varying degrees the susceptibility to shielding discussed earlier. Thus, they cannot provide the high level of security demanded in certain applications, such as a library.

It would therefore be desirable to provide an inexpensive, secure tag that could be used on, for example, airline luggage, overnight parcels, and library books to provide object identification, tracking, and security.

SUMMARY OF THE INVENTION

The present invention minimizes or eliminates the disadvantages associated with conventional tags of the types described above, by providing a tag including a combination of a magnetically-responsive element and a radio frequency-responsive element. By providing both elements on a single combination tag, the features of each may be realized and the disadvantages of each overcome. In one embodiment, the magnetically-responsive element serves as an antenna for the radio frequency-responsive element, either by being physically connected to the latter, or by being electrically coupled but not physically connected.

BRIEF DESCRIPTION OF THE DRAWINGS

The present invention is described in greater detail with reference to the attached Figures, in which like numbers represent like structure throughout the several views, and in which.

DETAILED DESCRIPTION OF THE INVENTION

The tag of the present invention incorporates both object identification and effective security in a single device. It includes an element that is responsive to a magnetic interrogation signal, and an element that is responsive to a radio frequency interrogation signal. In one embodiment, the magnetically-responsive element also provides the antenna for the radio frequency-responsive element. The term "responsive" means, in the context of the present invention, that the element provides intelligible information when subjected to an appropriate interrogation field. The individual elements are described first below, followed by a description of the combination tag of the present invention.

I. The Magnetically-Responsive Element

The magnetically-responsive element of the present invention is preferably made of a low coercive force, high permeability ferromagnetic material, such as the material used in the strips sold by the Minnesota Mining and Manufacturing Company of St. Paul, Minn. (3M) under the designation "TATTLETAPE™" brand strips. These strips, or marker assemblies, are described in several patents assigned to 3M, including U.S. Pat. No. 5,331,313 (Koning) and U.S. Pat. No. 3,747,086 (Peterson), the contents of which are incorporated by reference herein. Exemplary low coercive force, high permeability ferromagnetic materials include permalloy (a nickel/iron alloy), and high performance amorphous metals such as those available from the AlliedSignal Company of Morristown, N.Y. under the designations Metglas 2705M and Metglas 2714A.

The magnetically-responsive element may be either single status or dual status, depending on the nature of the article with which the element is associated. For example, certain reference books in libraries are not to be removed from the library, and thus a single-status (non-deactivatable) marker would always indicate whether such a book passed within an interrogation zone. Other articles, such as common library materials or commercial goods, may require a dual-status marker assembly, so that when the article has been properly processed the marker may be appropriately deactivated to prevent detection by the interrogation source. Dual status functionality is generally provided through the addition of sections of higher coercivity magnetic material in proximity to the low coercivity magnetic material, as described below and in the Peterson patent incorporated by reference above.

Certain magnetically-responsive elements have the ability to switch magnetic orientation rapidly when passed through a low frequency alternating magnetic field (50 Hz to 100 KHz, for example), and to produce a predetermined characteristic response that may be detected by the receiving coils of a detector. The switching function of the marker assembly is controlled by the magnetization state of the high coercive force elements, or "keeper elements." When these keeper elements are magnetized, the ability of the marker to magnetically switch back and forth within the alternating magnetic field of the interrogation zone is altered, and the marker typically is not detected. When the keeper elements are demagnetized, the marker can again perform the switching function, enabling the interrogation source to detect the presence of the marker. The keeper elements may be provided in different ways, as is known in the art.

The marker assembly may also include adhesive on one or both sides thereof, to enable the marker to be bonded to a book or other article. The adhesive layer(s) may be covered by a removable liner, to prevent adhesion of the marker to an unintended surface prior to application to the intended surface. These and other features of the marker assembly are described in the U.S. Pat. No. 3,790,945 (Fearon), U.S. Pat. No. 5,083,112 (Piotrowski), and U.S. Pat. No. 5,331,313 (Koning), all incorporated by reference above.

Because low frequency magnetic elements of this type are difficult to shield from detection, they may be effectively used on a wide variety of items when security is important. In addition, they may be deactivated and reactivated more conveniently, completely, and repeatedly than markers employing other EAS technologies, making them more suitable for use in certain applications (such as libraries) where this characteristic is highly desirable.

II. The Radio Frequency-Responsive Element

RFID tags can be either active or passive. An active tag incorporates an additional energy source, such as a battery, into the tag construction. This energy source permits active RFID tags to create and transmit strong response signals even in regions where the interrogating radio frequency field is weak, and thus an active RFID tag can be detected at greater range. However, the relatively short lifetime of the battery limits the useful life of the tag. In addition, the battery adds to the size and cost of the tag. A passive tag derives the energy needed to power the tag from the interrogating radio frequency field, and uses that energy to transmit response codes by modulating the impedance the antenna presents to the interrogating field, thereby modulating the signal reflected back to the reader antenna. Thus, their range is more limited. Because passive tags are preferred for many applications, the remainder of the discussion will be confined to this class of tag. Those skilled in the art, however, will recognize that these two types of tags share many features and that both can be used with this invention.

Figure 1A:
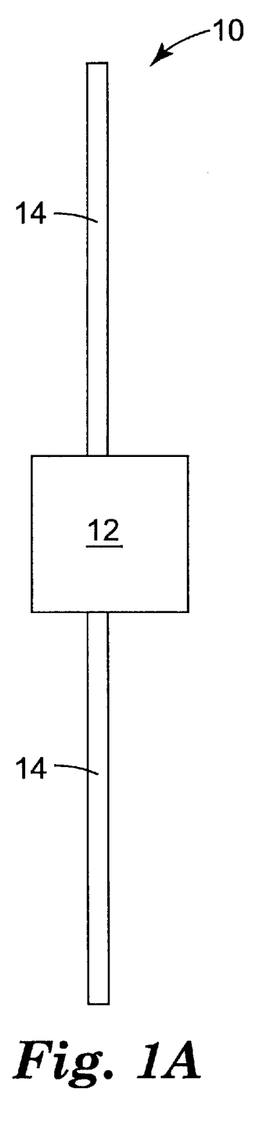
FIGS. 1A and 1B are schematic illustrations of radio frequency identification tags.
Figure 1B:
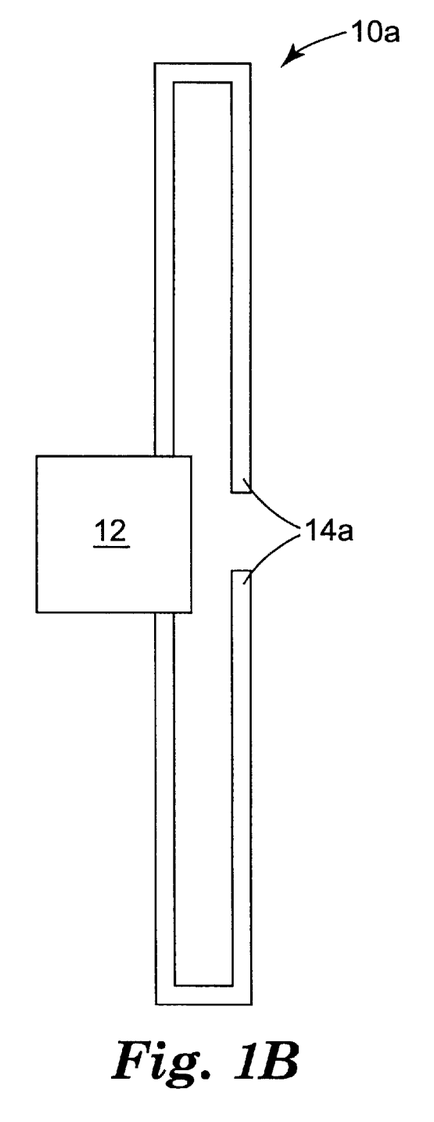

As shown in FIG. 1, a passive radio frequency-responsive element 10 typically includes two components: an integrated circuit 12 and an antenna 14. The integrated circuit provides the primary identification function. It includes software and circuitry to permanently store the tag identification and other desirable information, interpret and process commands received from the interrogation hardware, respond to requests for information by the interrogator, and assist the hardware in resolving conflicts resulting from multiple tags responding to interrogation simultaneously. Optionally, the integrated circuit may provide for updating the information stored in its memory (read/write) as opposed to just reading the information out (read only). Integrated circuits suitable for use in RFID markers include those available from Texas Instruments (in their TIRIS line of products), Philips (in their Mifare and Hitag line of products), Motorola/Indala, and Single Chip Systems, among others.

The antenna geometry and properties depend on the desired operating frequency of the RFID portion of the tag. For example, 2.45 GHz (or similar) RFID tags would typically include a dipole antenna, such as the linear dipole antennas 14 shown in FIG. 1A, or the folded dipole antennas 14a shown attached to the radio frequency responsive element 10a in FIG. 1B. A 13.56 MHz (or similar) RFID tag would use a spiral or coil antenna 14b, as shown attached to the radio frequency responsive element 10b in FIG. 2. In either ease, the antenna 14 intercepts the radio frequency energy radiated by an interrogation source. This signal energy carries both power and commands to the tag. The antenna enables the RF-responsive element to absorb energy sufficient to power the IC chip and thereby provide the response to be detected. Thus, the characteristics of the antenna must be matched to the system in which it is incorporated. In the case of tags operating in the high MHz to GHz range, the most important characteristic is the antenna length. Typically, the effective length of a dipole antenna is selected so that it is close to a half wavelength or multiple half wavelength of the interrogation signal. In the case of tags operating in the low to mid MHz region (13.56 MHz, for example) where a half wavelength antenna is impractical due to size limitations, the important characteristics are antenna inductance and the number of turns on the antenna coil. For both antenna types, good electrical conductivity is required. Typically, metals such as copper or aluminum would be used, but other conductors, including magnetic metals such as permalloy, are also acceptable and are, in fact, preferred for purposes of this invention. It is also important that the input impedance of the selected IC chip match the impedance of the antenna for maximum energy transfer. Additional information about antennas is known to those of ordinary skill in the art from, for example, reference texts such as J. D. Kraus, *Antennas* (2d ed. 1988, McGraw-Hill, Inc., New York).

Figure 2:
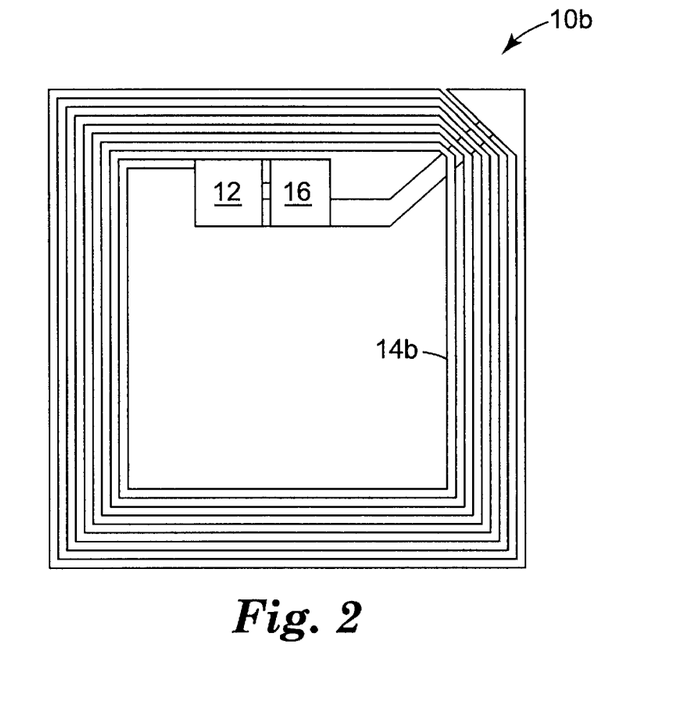
FIG. 2 is a schematic of a second embodiment of a radio frequency identification tag.

A capacitor 16 is often included to increase the performance of the marker, as shown in FIG. 2. The capacitor 16, when present, tunes the operating frequency of the tag to a particular value. This is desirable for obtaining maximum operating range and insuring compliance with regulatory requirements. The capacitor may either be a discrete component, or integrated into the antenna as described below. In some tag designs, particularly tags designed to operate at very high frequencies, such as 2.45 GHz, a tuning capacitor is not required. The capacitor is selected so that, when coupled to the inductance provided by the antenna, the resonant frequency of the composite structure, given by:

$$f_r = \left(\frac{1}{2\pi}\right)\sqrt{\frac{1}{LC}}$$

where
C=capacitance (in Farads)
L=inductance (in Henries)
closely matches the desired operating frequency of the RFID system. The capacitor may also be a distributed capacitor as described in U.S. Pat. No. 4,598,276 (Tait et al.) and U.S. Pat. No. 4,578,654 (Tait et al.), which are assigned to 3M. Distributed capacitance is desirable to reduce tag size, particularly thickness, and to minimize manual assembly.

Figure 4:
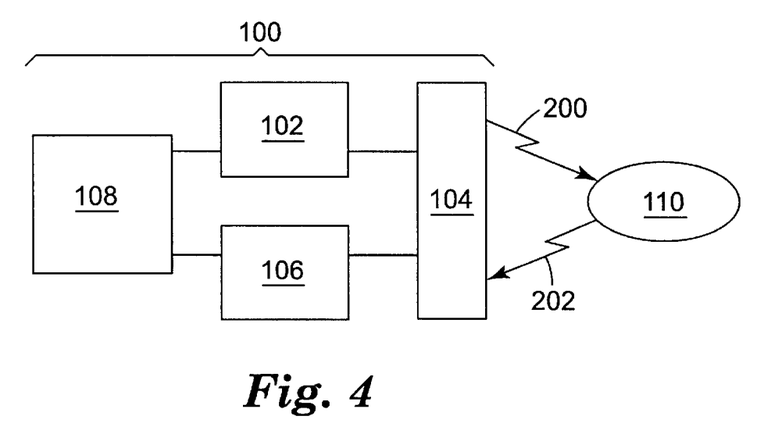
FIG. 4 is a block diagram of an RFID interrogation system interacting with an RFID tag.

In operation, as shown in FIG. 4, the radio frequency-responsive tag 110 is interrogated by an EAS security system 100, which is typically located near the point at which the tags are to be monitored. An interrogation zone may be established by placing spaced detection panels across the exits from the room in which the tagged articles are located, near a conveyor carrying items to be monitored, or the like. Hand held detection devices may also be used. An interrogation source 102 (typically including a drive oscillator and an amplifier) is coupled to an antenna 104 (sometimes described as a field coil) for transmitting an alternating radio frequency field, or interrogation signal, in the interrogation zone. The system 100 also includes an antenna for receiving a signal (shown as antenna 104, and sometimes described as a receiving coil) and detector 106 for processing signals produced by tags in the interrogation zone.

The interrogation source 102 transmits an interrogation signal 200, which may be selected within certain known frequency bands that are preferred because they do not interfere with other applications, and because they comply with applicable government regulations. When the radio frequency-responsive element receives an interrogation signal it transmits its own response code signal 202 that is received by the antenna 104 and transmitted to detector 106. The detector decodes the response, identifies the tag (typically based on information stored in a computer or other memory device 108), and takes action based on the code signal detected. Various modifications of the illustrated system are known to those of skill in the art including, for example, using separate antennas for the interrogation source 102 and the detector 106 in place of the single antenna 104 that is illustrated.

III. The Combination Tag

As shown in FIGS. 3 and 5 through 8, the combination tag 20 of the present invention combines a magnetically-responsive element with an RF-responsive element to provide the advantages of both. Thus, the two elements can be applied to an item of interest at the same time, thereby reducing cost. The combination tag may be provided with a pressure sensitive adhesive covered by a removable liner, which enables the combination tag to be adhered to a surface of the article when the liner has been removed. In another embodiment, the tag uses the magnetically-responsive element as an antenna for the radio frequency-responsive element. The magnetically-responsive element, when used as an antenna, is electrically coupled to the radio frequency-responsive element, and may or may not also be physically coupled to the radio frequency-responsive element.

The combination tag made according to the present invention may be interrogated two ways. First, the RFID interrogation source would use radio frequency signals to request and receive codes from the integrated circuit. This information would indicate, for example, the identification of the article with which the tag is associated, and whether the article had been properly processed. Second, a magnetic interrogation field would interrogate the tag to determine whether the magnetic portion of the marker assembly was active. If the marker assembly was active, the interrogation source would produce a response, such as a notification that the marked article had not been properly processed. Because the magnetic interrogation is more resistant to shielding than the radio frequency interrogation, the magnetic portion of the combination tag would provide enhanced security. Thus, the features of both magnetic and RFID tags are combined into a single combination tag.

In a preferred embodiment, the combination tag includes a magnetically-responsive element that also functions as the antenna in the circuitry of the radio frequency-responsive element. To serve both functions, the antenna material must exhibit low magnetic coercivity and very high magnetic permeability (to serve as an efficient security element), and moderate to high electrical conductivity (to function as an efficient antenna). In addition, the geometry of the antenna must be compatible with both functions. In this embodiment, the antenna could, for example, be fabricated from permalloy, an alloy of nickel and iron.

In one embodiment, a 3M "Tattle-Tape™" brand security strip, or other equivalent magnetic element, may be used as a linear dipole antenna to operate at 2.45 GHz or a similar high frequency. The length, width and thickness of this strip are selected to match the particular operating frequency and other characteristics of the RFID chip used. Typically, the strip would be made from permalloy (available from a number of sources including Carpenter Specialty Alloys, Reading, Pa., under the trade name "HyMu80") or an amorphous alloy such as that available from the AlliedSignal Company of Morristown, N.Y., under the designation 2705M, and its length would be between 6.35 and 16.5 cm (2.5 and 6.5 inches). The terminals of the integrated circuit would be physically connected to the ends of the security strip. Electrical measurements of impedance and power gain have established that such a magnetic strip provides the same fundamental electrical characteristics as the copper or aluminum dipole antennas normally used with such a chip, and thus it would be expected to perform both functions satisfactorily.

Figure 5:
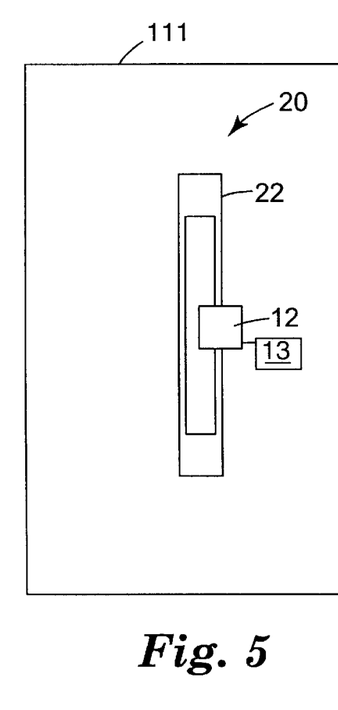
FIGS. 5, 6, 7, and 8 are illustrations of combination tags according to the present invention.
Figure 6:
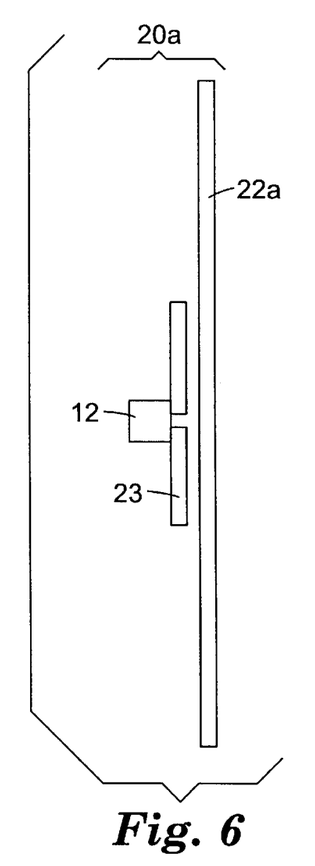
Figure 7:
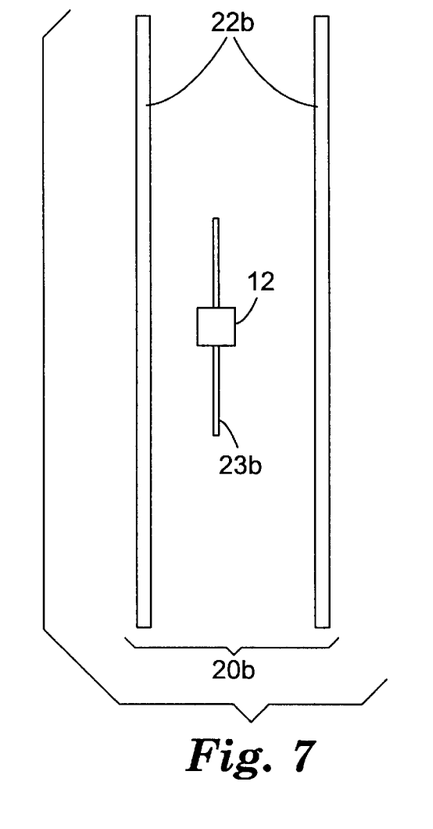
Figure 8:
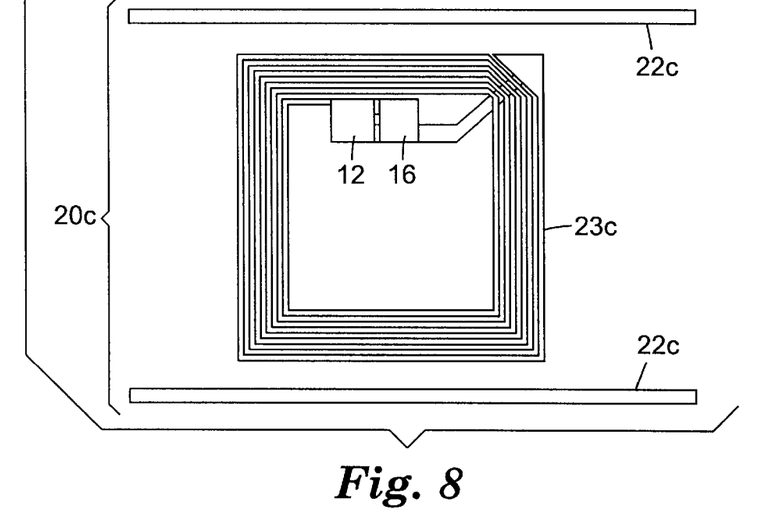

When the magnetically-responsive element is used as at least part of the antenna for the radio frequency-responsive element, the two are electrically coupled to each other. Electrical coupling may occur because of a physical connection between multiple elements (as shown in FIG. 5), or, in the absence of a physical connection, by non-contact electromagnetic coupling (as shown in FIGS. 6, 7, and 8). Non-contact coupling can include parasitic coupling, capacitive coupling, or inductive coupling, and use such antenna components as parasitic antenna elements, reflector and director antennas, Yagi-Uda antennas, or other suitable antenna configurations.

Figure 3:
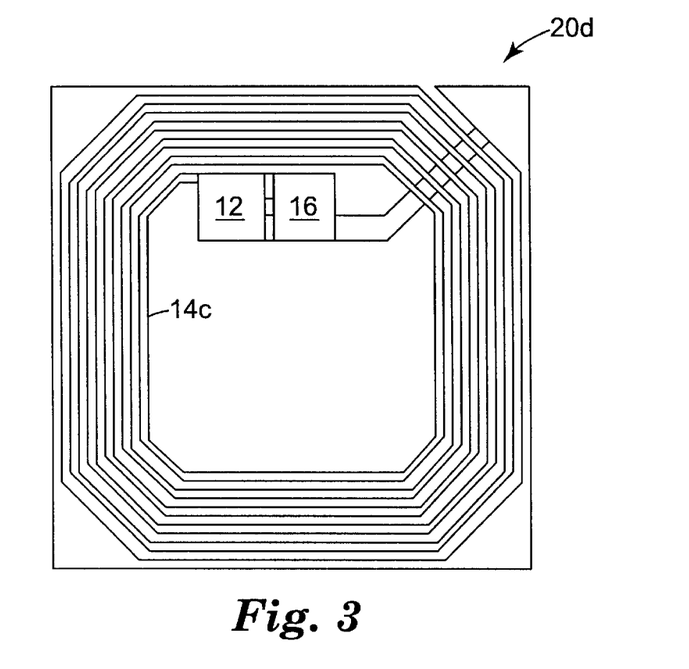
FIG. 3 is a schematic top view of a combination tag according to the present invention.

The combination tag shown in FIG. 3 includes coil turns made from magnetic material. The tag could be, for example, a 13.56 MHz tag having an antenna structure such as 14c in which flux collectors are provided at the corners to improve the magnetic function of the tag. Other types of flux collectors may be provided.

The combination tag 20 shown in FIG. 5 includes a physical connection between the antenna 22, which is made of magnetically-responsive material, and the integrated circuit 12. One or more keeper elements or the type described above also may be applied to the magnetically-responsive material, so that it may be selectively activated and deactivated to provide a dual status tag. The antenna 22a shown in FIG. 6, however, is not physically connected to the integrated circuit 12 or the dipole antenna 23, but is nonetheless electrically coupled to the dipole antenna by parasitic dipole coupling to provide a combination tag 20a. The dipole antenna 23 may comprise either magnetically-responsive material or non-magnetically-responsive material.

FIGS. 7 and 8 illustrate embodiments in which more than one antenna 22 is provided to electrically couple with antennas 23b and 23c, respectively. In the combination tag 20b shown in FIG. 7, integrated circuit 12 includes dipole antenna 23b, which is parasitically coupled to antennas 22b. Antennas 22b are made of magnetically-responsive material, and antenna(s) 23b may be made of magnetically-responsive material. In the combination tag 20c shown in FIG. 8, a radio frequency-responsive element of the type shown in FIG. 2 is parasitically electrically coupled to antennas 22c. Antennas 22c are made of magnetically-responsive material, and antenna(s) 23c may be made of magnetically-responsive material. Other variations of these embodiments are easily designed.

The overall thickness of the combination tag should be as small as possible, to enable the tag to be inconspicuously placed on or in an article. For example, the tag may be applied with adhesive between the pages of a book, and it is desirable to make the tag thin enough to prevent easy detection by observing the end of the book. Conventional ICs may be approximately 0.5 mm (0.02 in) thick, and the overall thickness of the tag is preferably less than 0.635 mm (0.025 in).

The combination tags of this invention may be provided in roll form, to enable the automated sequential application of individual tags to articles. This general system is described in, for example, PCT Publication No. WO 97/36270 (DeVale et al.).

Individual combination tags, one or more surfaces of which may be covered by an adhesive (such as a pressure sensitive adhesive), may be removed from the roll and applied between two pages of a book, near its binding. A page spreader may be provided to facilitate insertion of the combination tag, and other options such as sensors to detect the position of various components in the system may also be provided.

The combination tag of the present invention is believed to have particular, although not exclusive, use in the processing of library materials. Library materials having an RFID tag of this type could be checked in and out more easily, perhaps without human assistance. That is, the materials would automatically be checked out to a particular patron (who may herself have an RFID tag associated with her library card) when the patron passes through a suitable detection zone, and checked back in when the patron re-enters the library with the materials. The tag of the invention may also assist in inventory management and analysis, by enabling library administrators to keep track of materials instantaneously and continuously. These and other features of the invention can, of course, be brought to bear on other applications, such as materials handling in stores, warehouses, and the like.

In another embodiment, the combination tag of the present invention could provide dual-status marker information both through a magnetic response (indicating whether the magnetic features of the tag had been activated or deactivated) and through a radio frequency response (indicating, through the use of appropriate software, whether the database or the memory on the RFID chip itself showed that the item had been appropriately processed).

The present invention is further described with reference to the following Examples.

EXAMPLES

Example One

A combination tag was made in accordance with the present invention. A permalloy strip produced from an alloy available from the Carpenter Technology Corporation of Reading, Pa. under the designation "HyMu80" was attached to a test fixture manufactured by Single Chip Systems (SCS) of San Diego, Calif. The strip measured approximately 1.6 mm (0.625 in) wide by 0.0254 mm (0.001 in) thick by 10.16 cm (4 in) long. The test fixture consisted of a standard SCS 2.45 GHz antenna connected to an LED diode. The device was designed so that upon exposure to a 2.45 GHz field strong enough to power a typical SCS RFID tag the LED would glow, providing an immediate visible confirmation of the proper operation of the power-receiving portion of the device. Upon replacing the standard SCS antenna with the prototype permalloy antenna, the LED illuminated at approximately the same field strength, confirming the successful operation of the prototype.

Example Two

FIG. 3 illustrates another embodiment of an antenna that is believed useful with a 13.56 MHz RFID design. At this frequency, a coil-type antenna geometry is preferred. The spiral turns comprising the coil are formed from a magnetic alloy such as permalloy, either by etching (physical or chemical), die cutting, or deposition through a mask. The straight "arm" portions of the coil serve also as the magnetically responsive elements in this design. However, the reduced length of these metallic elements in this geometry limits the effectiveness of the magnetic security portion of the device. In the embodiment shown in FIG. 3, flux collection elements provided at the corners have been added to the antenna coil to overcome this limitation. The construction shown in FIG. 3 would, preferably, include a capacitor as previously described to tune the operating frequency of the antenna to the prescribed interrogation frequency.

The characteristics of the antenna described in this example were compared with the characteristics of known antennas for radio frequency integrated circuits, and because those characteristics were similar, it is believed that the antenna of this example would function adequately in such an application.

The present invention has been described with regard to several embodiments thereof. Persons of ordinary skill in the art will appreciate that modifications of the embodiments described will also be within the scope of the invention.

We claim:

1. A combination tag, comprising:
   (a) a magnetically-responsive, detectable security element; and
   (b) a radio frequency-responsive element including an integrated circuit that is reprogrammable, the radio frequency-responsive element having information storage and transmission capabilities to enable an interrogation system to obtain information from the radio frequency-responsive element, wherein the radio frequency-responsive element is electrically coupled to the magnetically-responsive element and uses the magnetically-responsive element as at least part of an antenna.

2. A combination tag according to claim 1 wherein the magnetically-responsive element includes a low coercive force, high permeability ferromagnetic material.

3. The combination tag of claim 1, wherein the radio frequency-responsive element is physically coupled to the magnetically-responsive element.

4. The combination tag of claim 1, wherein the magnetically-responsive element provides dual status information.

5. The combination tag of claim 1, wherein the radio frequency-responsive element communicates with a database to provide dual status information.

6. The combination tag of claim 1, wherein the tag includes a programmable memory element that provides dual status information.

7. The combination tag of claim 1, wherein the radio frequency-responsive element includes a battery.

8. The combination tag of claim 1, where the magnetically-responsive element comprises a high permeability, low coercivity alloy of nickel and iron.

9. The combination tag of claim 1, wherein the magnetically-responsive element consists of a high permeability, low coercivity amorphous alloy.

10. The combination tag of claim 1, wherein the magnetically-responsive element is a thin film.

11. The combination tag of claim 1, wherein the antenna is an electrical dipole.

12. The combination tag of claim 1, wherein the antenna is a coil.

13. The combination tag of claim 1, wherein the tag further comprises a capacitor.

14. The combination tag of claim 13, wherein the capacitor is a distributed capacitor.

15. A system including the combination tag of claim 1, wherein the system further comprises at least one interrogation source.

16. The system of claim 15, wherein the system includes an interrogation source for interrogating the magnetically-responsive element, and an interrogation source for interrogating the radio frequency-responsive element.

17. The system of claim 15, wherein the system further includes a detector for detecting the presence of the combination tag.

18. The system of claim 17, installed in a library.

19. The system of claim 17, wherein the system further includes a database having information about the combination tag.

20. The combination tag of claim 1, wherein the tag is associated with a library material.

21. The combination tag of claim 20, wherein the library material is a book.

22. The combination tag of claim 1, wherein the tag has a maximum thickness of approximately 0.5 mm.

23. A roll comprising a multiplicity of the combination tags of claim 1, the roll enabling automated sequential application of the tags to articles.

24. The combination tag of claim 1, wherein the magnetically-responsive element is responsive to an applied interrogation signal in the range of 50 Hz to 100 kHz, and the radio frequency-responsive element is responsive to a signal in the range of 125 kHz to 6 GHz.

* * * * *

UNITED STATES PATENT AND TRADEMARK OFFICE
CERTIFICATE OF CORRECTION

PATENT NO.     : 6,154,137
DATED          : November 28, 2000
INVENTOR(S)    : Edward D. Goff et al.

It is certified that error appears in the above-identified patent and that said Letters Patent is hereby corrected as shown below:

<u>Title page,</u>
Item [56], References Cited, U.S. PATENT DOCUMENTS,
Please delete "5,789,626  7/1998  Brady  257/673" and insert in place thereof
-- 5,786,626  7/1998  Brady  257/673 --.

Signed and Sealed this

Twenty-first Day of January, 2003

JAMES E. ROGAN
*Director of the United States Patent and Trademark Office*